US012450502B2

(12) United States Patent
Osborn et al.

(10) Patent No.: US 12,450,502 B2
(45) Date of Patent: *Oct. 21, 2025

(54) RESPONSE PREDICTION FOR ELECTRONIC COMMUNICATIONS

(71) Applicant: Capital One Services, LLC, McLean, VA (US)

(72) Inventors: Kevin Osborn, Newton Highlands, MA (US); Eric Loucks, Tysons, VA (US); Joshua Edwards, Philadelphia, PA (US); George Bergeron, Falls Church, VA (US); Kyle Johnson, Washington, DC (US); Brian Lee, South Riding, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/407,892

(22) Filed: Jan. 9, 2024

(65) Prior Publication Data
US 2024/0144054 A1 May 2, 2024

Related U.S. Application Data

(63) Continuation of application No. 18/195,653, filed on May 10, 2023, now Pat. No. 11,907,862, which is a (Continued)

(51) Int. Cl.
G06N 5/04 (2023.01)
G06F 40/30 (2020.01)
(Continued)

(52) U.S. Cl.
CPC ............... *G06N 5/04* (2013.01); *G06F 40/30* (2020.01); *G06N 20/00* (2019.01); *H04L 51/10* (2013.01)

(58) Field of Classification Search
CPC .......... G06N 5/04; G06N 20/00; G06F 40/03; H04L 51/10
(Continued)

(56) References Cited

U.S. PATENT DOCUMENTS 11,687,803 B2 6/2023 Osborn et al.
2016/0328224 A1 11/2016 Babey et al.
(Continued)

OTHER PUBLICATIONS

Sep. 10, 2021—(WO) International Search Report and Written Opinion—App PCT/US21/35522.

*Primary Examiner* — Alan S Chou
(74) *Attorney, Agent, or Firm* — Banner & Witcoff, Ltd.

(57) ABSTRACT

Systems, methods, and apparatuses are described herein for performing sentiment analysis on electronic communications relating to one or more image-based communications methods, such as emoji. Message data may be received. The message data may correspond to a message that is intended to be sent but has not yet been sent to an application. Using a first machine learning model, one or more subsets of the plurality of emoji may be determined. The one or more subsets of the plurality of emoji may comprise one or more different types and quantities of emoji, and may each correspond to the same or a different sentiment. Using a second machine learning model, one or more emojis may be selected from the one or more subsets. The one or more emojis selected may correspond to responses to the message.

20 Claims, 4 Drawing Sheets

Related U.S. Application Data continuation of application No. 16/892,705, filed on Jun. 4, 2020, now Pat. No. 11,687,803.

(51) Int. Cl.
    *G06N 20/00*     (2019.01)
    *H04L 51/10*     (2022.01)

(58) Field of Classification Search
    USPC .......................................................... 706/12
    See application file for complete search history.

(56) References Cited

U.S. PATENT DOCUMENTS

| | | |
|---|---|---|
| 2017/0052946 A1 | 2/2017 | Gu et al. |
| 2017/0180276 A1 | 6/2017 | Gershony et al. |
| 2017/0344224 A1 | 11/2017 | Kay et al. |
| 2020/0110794 A1* | 4/2020 | Vos ....................... G06F 40/279 |
| 2021/0097468 A1 | 4/2021 | Socolof et al. |

\* cited by examiner

RESPONSE PREDICTION FOR ELECTRONIC COMMUNICATIONS

CROSS REFERENCE TO RELATED APPLICATIONS

This application is a continuation of U.S. patent application Ser. No. 18/195,653, filed May 10, 2023, titled Response Prediction for Electronic Communications, which is a continuation of U.S. patent application Ser. No. 16/892,705 filed Jun. 4, 2020, titled Response Prediction for Electronic Communications. The contents of the above listed application is expressly incorporated herein by reference in its entirety for any and all non-limiting purposes.

FIELD OF USE

Aspects of the disclosure relate generally to electronic communications, and more specifically to using machine learning to determine predicted responses to electronic communications.

BACKGROUND

Electronic communications increasingly rely on non-textual content. For example, a chat application executing on a computing device may permit users to send messages comprising textual content, one or more images, one or more audio samples, or the like. Emojis, also referred to as emoticons, are examples of such images. Users may include emojis in messages and/or in response to messages, such that emojis may contain significant amounts of information about users' sentiment regarding a particular topic.

The variety of textual and non-textual content in electronic communications can make determining likely responses to a message (e.g., one that has not yet been posted on a communications application) particularly difficult. The nature of images and/or audio samples attached to textual content may indicate that the otherwise innocuous textual content may be sarcastic and/or might generate unexpected disdain from those responding to the textual content. For example, a particularly unflattering image of a fast food item along with the message "I love fast food" may indicate sarcasm and/or might generate negative feedback from other users. As another example, a message stating "Tell me what you think about this brand" followed by thumbs down may encourage negative sentiment about the brand. As such, a message intending to be friendly and/or innocuous might inadvertently trigger other users to provide negative responses.

Aspects described herein may address these and other problems, and generally improve the quality, efficiency, and speed of determining likely responses (e.g., emoji responses) to messages that have not yet been made public.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein relate to performing sentiment analysis on electronic communications relating to one or more image-based communications methods, such as emoji. A computing device may receive data corresponding to a message. The message may be intended to be sent but might not yet have been sent to an application executing on a second computing device. The computing device may process, using a first machine learning model, the message to determine one or more subsets of a plurality of emojis. The one or more subsets of the plurality of emojis may correspond to one or more predicted responses to the message. At least one of the one or more subsets may correspond to at least two different emoji types. The first machine learning model may have been trained to group the one or more subsets of the plurality of emojis according to sentiment associated with the at least two different emoji types. The computing device may select, using one or more second machine learning models and based on the message, one or more second emojis from the one or more subsets of the plurality of emojis. The one or more second emojis may correspond to a predicted response to the message. The one or more second machine learning models may be trained based on a history of responses to second messages. The computing device may transmit the one or more second emojis.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
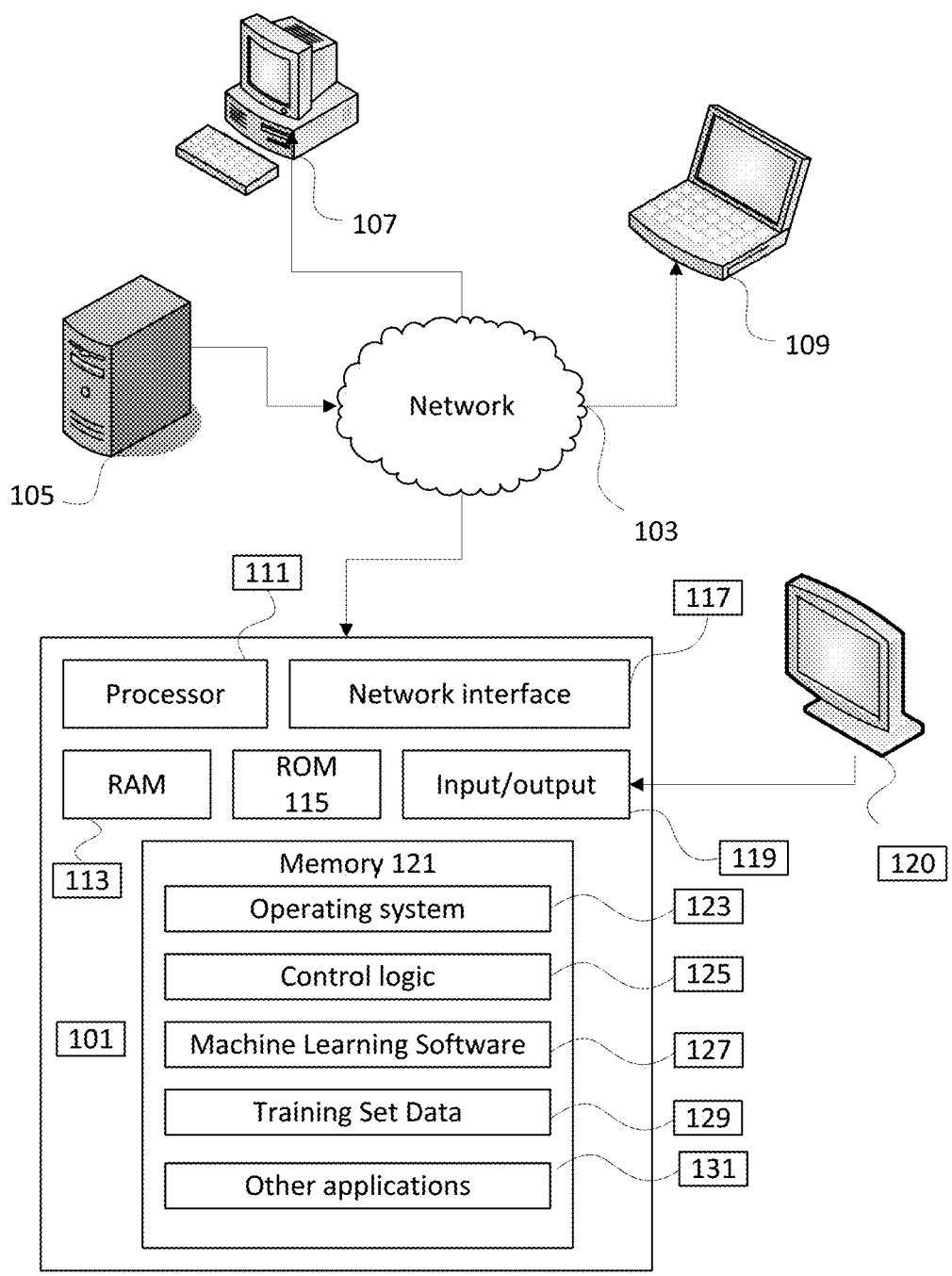
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for predicting responses to electronic communications. Electronic communications, like other forms of communications, can be difficult to predict. For example, content intending to be innocuous may trigger users to respond negatively due to, for example, the context, time, and/or manner in which the content is posted. This is undesirable for companies, as content intended to promote the company may in fact harm the company. There is thus a strong demand for methods to predict likely responses to messages that have not yet been posted online in a manner which allows users to avoid circumstances where those messages might encourage undesirable responses.

Systems as described herein may predict responses to electronic communications and, particularly, predict emoji responses to messages intended for an application. A computing device may receive data corresponding to a message. The message may be intended to be sent but might not yet have been sent to an application executing on a second computing device. The message may comprise textual content, one or more emojis, and/or other content. The application may be a messaging application, and the message may be intended to be posted in the application. The computing device may process, using a first machine learning model, the message to determine one or more subsets of a plurality of emojis. The one or more subsets of the plurality of emojis may correspond to one or more predicted responses to the message. At least one of the one or more subsets may correspond to at least two different emoji types. A first emoji type of the at least two different emoji types corresponds to a positive reaction, and a second emoji type of the at least two different emoji types corresponds to a negative reaction. The first machine learning model may have been trained to group the one or more subsets of the plurality of emojis according to sentiment associated with the at least two different emoji types. The first machine learning model may have been trained using a history of second responses to second messages in one or more applications. Processing the message may comprise weighting each of the plurality of emojis based on a quantity of the plurality of emojis that correspond to an emoji type and/or a sentiment corresponding to the emoji type. Processing the message may comprise determining that a first emoji of the plurality of emojis belongs to a first subset of the one or more subsets based on one or more second emojis of the plurality of emojis. At least one of the one or more subsets may correspond to a first quantity of a first emoji type of the at least two different emoji types, and a second quantity of a second emoji type of the at least two different emoji types. The computing device may select, using one or more second machine learning models and based on the message, one or more second emojis from the one or more subsets of the plurality of emojis. The one or more second emojis may correspond to a predicted response to the message. The one or more second machine learning models may be trained based on a history of responses to second messages. The one or more second machine learning models are trained using a history of second responses from one or more second applications different than the application. The computing device may transmit the one or more second emojis. The computing device may transmit the one or more second emojis by transmitting a confidence value associated with each of the one or more second emojis. The computing device may transmit the one or more second emojis by transmitting a count of the one or more second emojis.

Systems and methods described herein improve the functioning of computers by improving the method in which computing devices can process and understand electronic communications. In particular, the systems and methods described herein improve the ability of computers to process complex and nuanced communications data and to determine, based on that data, predicted responses to the communications. While machine learning models may be trained on a variety of different data sets, conventional machine learning models are still ill-equipped to learn about the nuance of human communications, particularly electronic communications which provide communication methods above and beyond mere text (e.g., emoji). By, among other steps, determining one or more subsets of the plurality of emoji, the system described herein allows such machine learning models to better understand the sentiment of electronic communications in a nuanced manner. Accordingly, the accuracy of response prediction performed by machine learning models may be improved, and the results based on results from such machine learning models (e.g., predicted responses to a message that has not yet been posted to a communications application) may be improved.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for using stochastic gradient boosting techniques to train deep neural networks.

Figure 2:
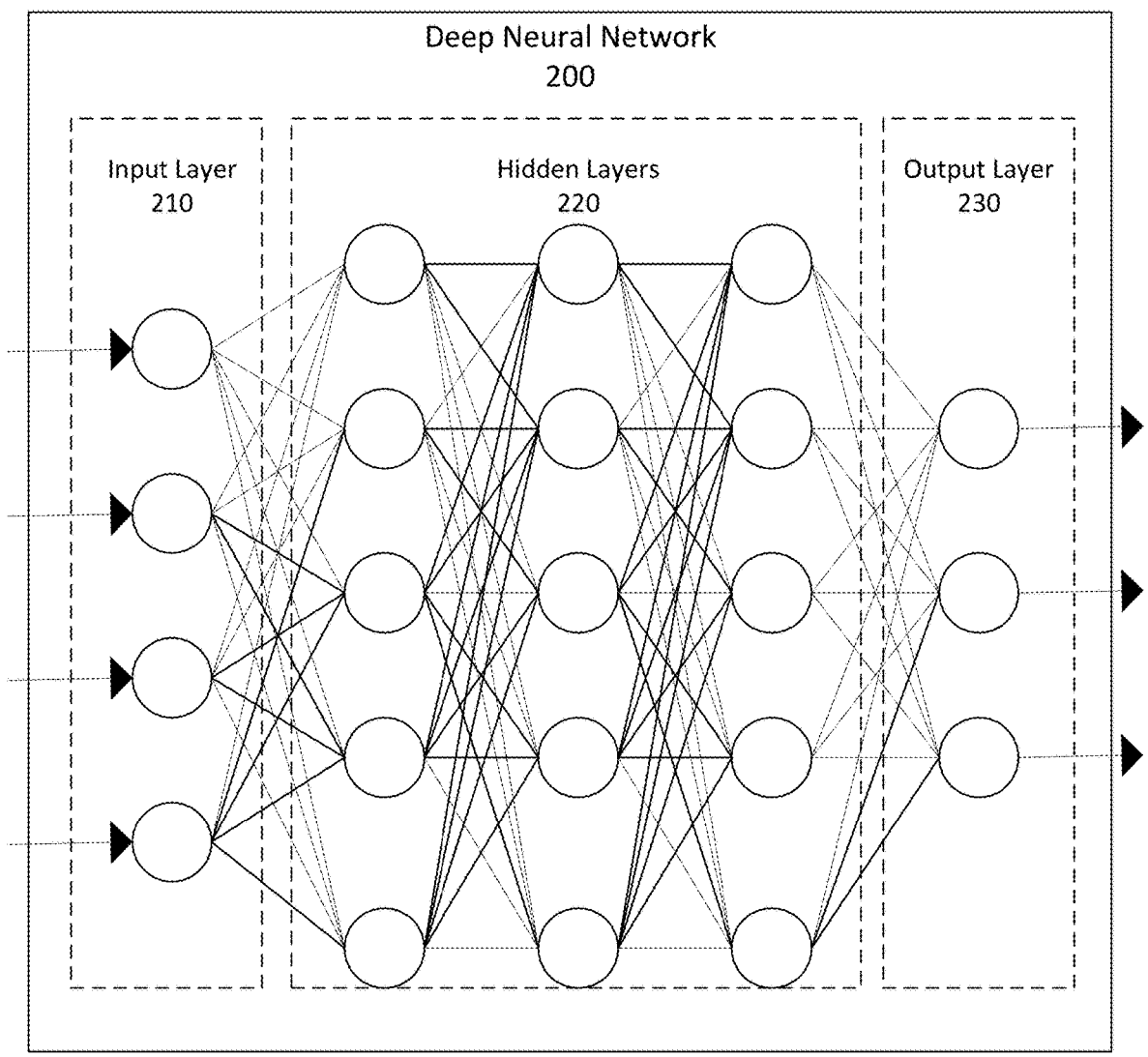
FIG. 2 depicts an example deep neural network architecture for a model according to one or more aspects of the disclosure.

FIG. 2 illustrates an example deep neural network architecture 200. An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
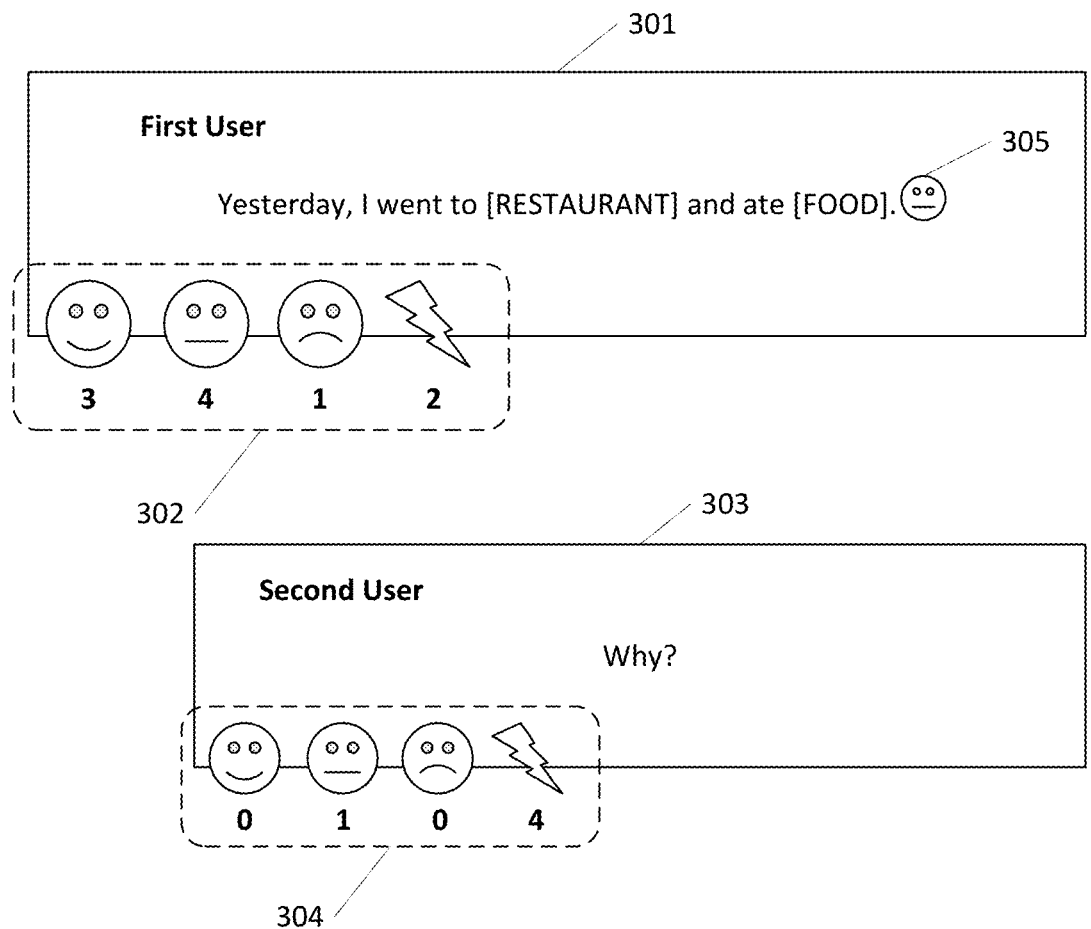
FIG. 3 shows a communications application with messages and emojis.

Discussion will now turn to an example of applications which permit electronic communications using non-textual content, such as emoji. FIG. 3 shows a communications application 300, which in the illustrative example shown in FIG. 3 comprises a message 301 from a first user and a reply 303 to the message 301 from a second user. The message 301 is associated with a first plurality of emoji 302 and, in particular, three smiley faces, four neutral faces, one sad face, and two lightning bolts. The message 301 also comprises a third plurality of emoji 305 in the textual content of the message 301. Specifically, the third plurality of emoji 305 comprises a neutral face. The reply 303 is associated with a second plurality of emoji 304 and, in particular, zero smiley faces, one neutral face, zero sad faces, and four lightning bolts. The communications application 300 may execute on one or more computing devices, such as the network nodes 101, 105, 107, and 109, and/or may communicate via a network, such as the network 103.

The communications application 300 shown in FIG. 3 is an example: any application which permits communications between two or more users may be used in accordance with the features described herein. For example, the communications application 300 may be a messaging application that facilitates the sending and/or receipt of messages between two or more users. The communications application 300 may be executed on a smartphone, in a web browser, on a personal computer, and/or on or via any form of computing device. For example, the communications application 300 may be a social networking service website.

Messages and/or replies, such as the message 301 and the reply 303, may be any combination of text, images, video, and/or audio. For example, the message 301 may comprise text relating to a restaurant, an image in the message 301 may show the food the user ate at the restaurant, and a video in the message 301 may show the ambiance of the restaurant. Such content may include the third plurality of emojis 305. Accordingly, the message 301 and the reply 303 may be any combination of audiovisual and/or textual content, including one or more emojis. Users may provide messages and/or replies in any manner specified by the communications application 300. For example, the reply 303 may comprise additional emoji (not shown in FIG. 3).

Emoji, such as the first plurality of emoji 302 and/or the second plurality of emoji 304, may be any images which may be selected by one or more users as part of formulating a message and/or reply. For example, an emoji may correspond to a reaction, by one or more users, to a message and/or reply. Emoji may comprise small images (e.g., icons) which represent concepts such as plants (e.g., a flower), animals (e.g., a cat), emotions (e.g., a thumbs up), or the like. Multiple different types of emoji may be associated with the same message and/or reply, and multiple of the same type of emoji may be associated with the same message and/or reply. For example, as shown in FIG. 3, multiple users may respond to the same content (e.g., the message 301) with multiple different types of emoji. As another example, as also shown in FIG. 3, a user may respond to a message with a reply (e.g., the reply 303), and that reply may itself comprise one or more emoji.

The number, nature, and/or use of emoji may be specified by one or more standards. For example, the Unicode standard has defined a number of emoji comprising different symbols, such as faces, weather, vehicles and buildings, food and drink, animals and plants, or icons that represent emotions, feelings, and activities. These emoji may correspond to an arbitrary number of other characters (e.g., a colon and half of a parentheses, which may form a smiley face) which may be converted by applications into a graphical representation of an emoji.

The number, nature, and/or use of emoji may be the same or different based on which device is used to input such emoji. For example, different smartphone manufacturers may use different styles of emoji which may correspond to the same or different sentiments. Different emoji (e.g., different forms of the same emoji, such as a thumbs up emoji from a laptop and a thumbs up emoji from a smartphone) may be treated the same (e.g., in that they represent the same sentiment) or differently (e.g., that they may be used to determine sentiment of groups of users based on which type of computing device used to enter the emoji).

It may be difficult to discern the sentiment of a message, particularly given the complexity of human interaction. As one example, the message "good luck" might be intended to be positive (that is, meaning that the sender intends the recipient to have good luck) or negative (that is, for example, meaning that the sender might disagree with a plan of the recipient). As another example, without more information, it is not clear what any of the emoji in the first plurality of emoji 302 and/or the second plurality of emoji 304 mean, as in both cases the emoji are abstract shapes. As another example, the message 301 states "Yesterday, I went to [RESTAURANT] and ate [FOOD]" along with the neutral smiley face, and the reply 303 says "Why?" Without more, the message 301 and the reply 303 do not clearly indicate whether a positive or negative sentiment regarding the food and/or restaurant are implied.

Figure 4:
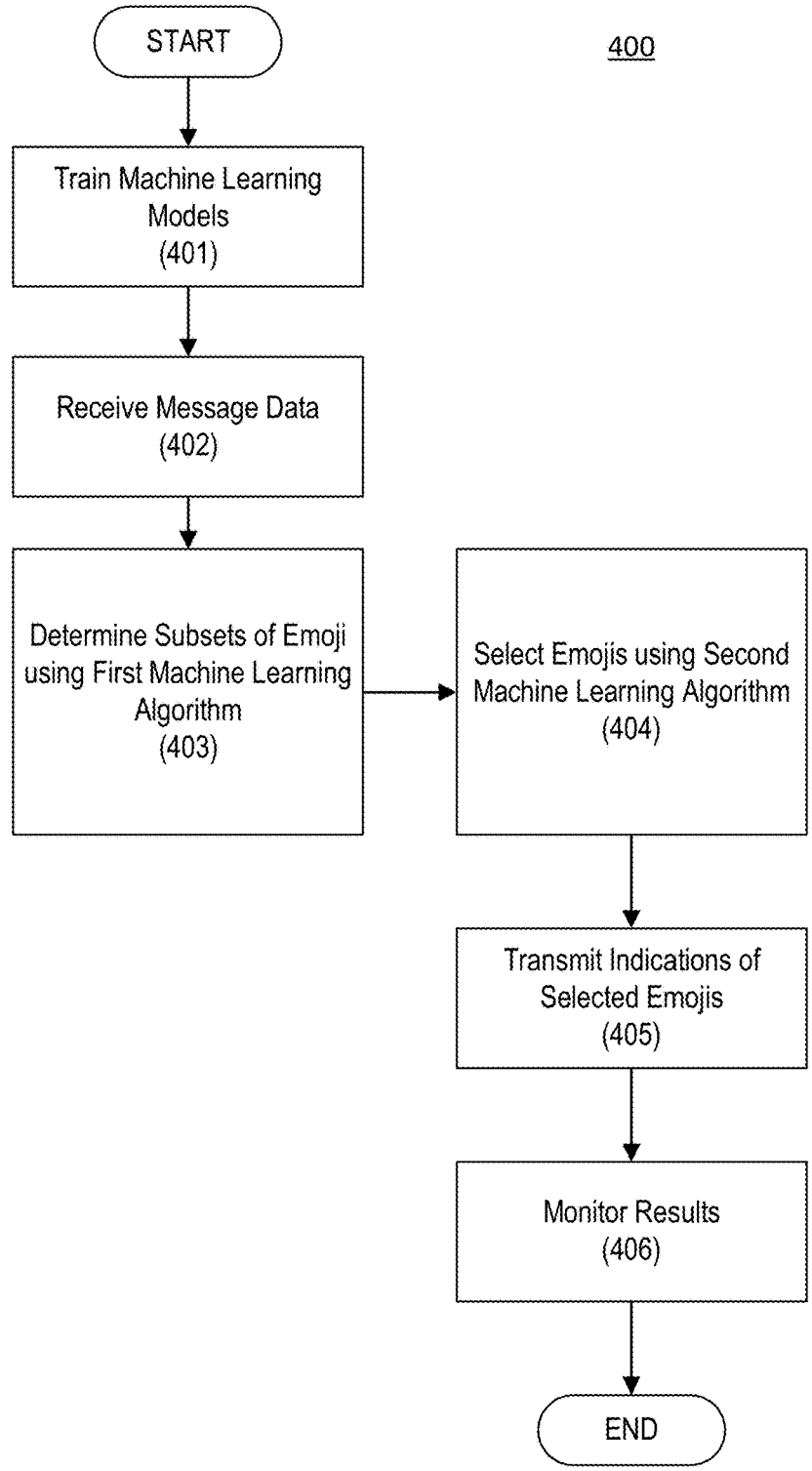
FIG. 4 shows a flow chart of a process for determining predicted responses to electronic communications according to one or more aspects of the disclosure.

Discussion will now turn to using machine learning models to ascertain predicted responses to a message, such as the message 301. FIG. 4 shows a flow chart of a process for ascertaining a predicted response to a message according to one or more aspects of the disclosure. Some or all of the steps of process 400 may be an algorithm and/or may be performed using one or more computing devices as described herein. Moreover, some or all of the steps of the process 400 may be stored on non-transitory computer-readable media that, when executed, cause a computing device to perform all or some of the steps of the process 400.

In step 401, one or more machine learning models may be trained. As described further below, at least two machine learning models may be used: a first machine learning model to determine one or more groups of emojis, and one or more second machine learning models to determine one or more emoji from the one or more groups of emojis. Training the machine learning models may comprise training the machine learning models using data from one or more applications. For example, the first machine learning model may be trained to group emoji according to sentiment associated, such as sentiment according to one or more emoji of each group of emoji. Such training data may be tagged to aid the first machine learning model in detecting, for example, sarcasm, sadness, attempts at humor, or the like. The first machine learning model may be trained using a history of second responses to second messages in the application, such that, e.g., the subsets are determined based on sentiment similarity as determined by historical responses in the application. As another example, the one or more second machine learning models may be trained to select, from the groups of emoji determined by the first machine learning model, a predicted response to a message based on a history of responses to one or more messages. For instance, a second machine learning model may be trained based on data indicating how users typically respond to certain messages. As such, the first machine learning model and the one or more second machine learning models might differ at least in that the first machine learning model may be trained to group emoji (e.g., based on a degree of similarity, a common sentiment, or the like) based on a message (e.g., a message intended to be sent but not yet sent to an application), whereas the one or more second machine learning models may be configured to select, from those groups and based on the message, one or more emoji.

In step 402, message data may be received. Message data may comprise any information about one or more messages (e.g., a post, a text message, a reply, or the like) in any application (e.g., a communications application). The message data may comprise textual content, such as proposed text for the message. The message to which the message data corresponds may be intended to be sent, but not yet sent, to an application. For example, the message may be intended for posting in a communication application. The message data need not be in any particular format. Receiving the message data may comprise receiving, from a user, textual content intended to be sent to an application.

In step 403, the message data may be processed to determine one or more subsets of a plurality of emoji using a first machine learning model. The plurality of emoji may be processed to determine one or more subsets of emoji corresponding to a different quantity of the plurality of emoji. The first machine learning model may be trained based on the sentiment of the grouped emoji, as described in more detail above with respect to step 401.

Processing the message data to determine subsets of the plurality of emoji may comprise determining one or more subsets of the plurality of emoji. The first machine learning model may be trained to process, based on the message data, the plurality of emoji into subsets which may, e.g., represent different sentiments and/or different combinations of sentiments. For example, a first subset may comprise emoji relating to negative sentiment, whereas a second subset may comprise emoji relating to sarcasm. Each subset may comprise a different number of different types of emoji. For example, one subset may comprise two thumbs up and two thumbs down emoji, whereas another subset may comprise one thumbs up, one thumbs down, and one smiley face emoji. Each subset need not comprise the same number of emojis, nor does each subset need to comprise the same number of different types of emoji. One or more emojis of the plurality of emojis may be determined to be part of a subset based on other members of the subset. For example, for a subset comprising two thumbs down emoji and one thumbs up emoji, the system may be configured to first determine whether two thumbs down emoji exist in the plurality of emoji, and the system may then check whether a single thumbs up emoji exists in the plurality of emoji.

Processing the message to determine the subsets of the plurality of emoji may comprise determining a plurality of the same subset of the plurality of emoji. In this manner, the first machine learning model may indicate a number of times that the same subset is repeated. For example, for a plurality of emoji comprising 20 thumbs down emoji and 10 cat emoji, the first machine learning model may conclude that there are 10 of the same subset, wherein the subset comprises two thumbs down emoji and one cat emoji. Accordingly, the first machine learning model need not group the plurality of emoji into excessively large subsets, but may instead represent the plurality of emoji as a plurality of subsets, with some subsets being repeated. Some subsets may comprise wildcards, such that any emoji may fill in a particular portion of a subset.

Processing the message data to determine the subsets of the plurality of emoji may comprise weighting one or more of the emoji and/or one or more of the subsets of the plurality of emoji. Different types and/or quantities of emoji may correspond to different strengths of sentiment. For example, one hundred thumbs down emoji may be weighted more strongly than fifty thumbs up emojis. The weighting may be based on the strength of the sentiment of one or more emoji. For example, a single angry face emoji may be weighted more strongly than a single thumbs down emoji, as the former may suggest a greater degree of negativity than the latter. Weighting the one or more of the emoji and/or the one or more of the subsets of the plurality of emoji may comprise multiplying a number of emoji by a value reflective of the strength of sentiment of the emoji. Such weighting may comprise multiplying the quantity of one or more emoji by a constant. For example, an angry face emoji may be associated with a double multiplier, such that fifty angry face emoji may be weighted to be worth the same as one hundred thumbs down emoji.

Processing the message data to determine the subsets of the plurality of emoji may comprise reordering the plurality of emoji and/or the subsets of the plurality of emoji. Some machine learning models, such as the second machine learning model (discussed below), may make determinations based in part on the ordering of emoji (and/or subsets of emoji). As such, processing the message to determine the subsets of the plurality of emoji may comprise arranging the subsets of the plurality of emoji in a particular order. For example, larger and/or stronger sentiment subsets may be placed earlier in an order than smaller and/or weaker sentiment subsets. As another example, if a subset is repeated in the plurality of emoji, it may be placed earlier in an order than a subset that is not repeated. The order may be predetermined based on, e.g., a subjective evaluation of the sentimental strength of one or more emoji. For example, a crying emoji may be considered to have a stronger sentimental weight than a thumbs up emoji. Relatedly, the ordering of emoji in a subset (e.g., first two thumbs up, then one thumbs down) may be predetermined so as to standardize the subsets for subsequent analysis.

In step 404, one or more second emoji may be selected, based on the message data, using a second machine learning model. The one or more second emoji may be determined based on the subsets of emoji determined using the first machine learning model. The one or more second emoji may be the most popular response of a plurality of different possible responses (e.g., a plurality of possible emoji responses). For example, the one or more second emoji may be determined by processing, using the second machine learning model, the message data and the subsets of the plurality of emoji to determine a sentiment of a message, then selecting one or more emoji which are likely responses to the sentiment of the message. Determining the sentiment of the message in this manner may comprise picking a most prevalent sentiment of the message and/or the subsets of the plurality of emoji. The second machine learning model may be different than the first machine learning model. Moreover, the second machine learning model may be trained differently than the first machine learning model. For example, the second machine learning model may be trained based on a history of emoji responses to messages so as to determine which emoji are likely to be responses to the message.

Determining the one or more second emoji in step 404 may comprise determining likely and/or unlikely response to the messages. For example, if the message and/or subsets of the plurality of emoji indicate sarcasm, then a response taking the message seriously may be undesirable. As another example, if the message and/or subsets of the plurality of emoji indicate sadness, then a response being comical may be unwelcome. Thus, output from step 404 may comprise one or more second emoji, a degree of confidence of the one or more second emoji (e.g., how likely the second machine learning model(s) predict the emoji is to be used in response), one or more emoji that are likely to not be received in response to the message, and the like.

In step 405, indications of the one or more second emoji may be transmitted. The one or more second emoji may be transmitted in a manner which indicates a degree of confidence (e.g., as a confidence value, a percentage, or the like) for the one or more second emoji. For example, the one or more second emoji may be transmitted by sending, to a computing device, percentage values corresponding to at least one of the one or more second emoji. Transmitting the indications of the one or more second emoji may comprise transmitting a plurality of unlikely emoji responses. Transmitting the indications of the one or more second emoji may comprise transmitting a count of the one or more second emoji.

In step 406, results of the response may be monitored. Users may respond to the response (e.g., in a communications application) positively or negatively. Based on those further responses, the first machine learning model and/or the second machine learning model may be further trained.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A first computing device comprising:
   one or more processors; and
   memory storing instructions that, when executed by the one or more processors, cause the first computing device to:
      before sending a first message to a second computing device:
         process, using a first trained machine learning model configured to determine subsets comprising at least two text elements of a plurality of text elements, the first message to determine one or more subsets comprising at least two different text elements of the plurality of text elements, wherein at least one of the one or more subsets corresponds to at least two different text element types, and wherein the first trained machine learning model was trained by modifying using first training data, one or more first weights of a first artificial neural network;
         select, using a second trained machine learning model configured to select text elements of the plurality of text elements that correspond to one or more predicted responses to one or more messages and based on the first message, one or more second text elements from the one or more subsets of the plurality of text elements, wherein the second trained machine learning model was trained by modifying, using second training data different from the first training data, one or more second weights of a second artificial neural network; and
         transmit the one or more second text elements.

2. The first computing device of claim 1, wherein the second computing devices executes an application, wherein the application is a messaging application, and wherein the first message is intended to be posted in the messaging application.

3. The first computing device of claim 1, wherein the instructions, when executed by the one or more processors, cause the first computing device to process the first message by causing the first computing device to:
   weight each of the plurality of text elements based on:
      a quantity of the plurality of text elements that correspond to an text element type; and
      a sentiment corresponding to the text element type.

4. The first computing device of claim 1, wherein a first text element type of the at least two different text element types corresponds to a positive reaction, and wherein a second text element type of the at least two different text element types corresponds to a negative reaction.

5. The first computing device of claim 1, wherein at least one of the one or more subsets further corresponds to:
   a first quantity of a first text element type of the at least two different text element types, and
   a second quantity of a second text element type of the at least two different text element types.

6. The first computing device of claim 1, wherein the first trained machine learning model is trained using first training data that comprises a history of messages in one or more of a plurality of applications that each comprise a plurality of different text element corresponding to one or more different sentiments.

7. The first computing device of claim 1, wherein the second trained machine learning model was trained using second training data that comprises a history of responses to one or more past messages of a history of messages in one or more of a plurality of applications.

8. The first computing device of claim 1, wherein the instructions, when executed by the one or more processors, cause the first computing device to transmit the one or more second text elements by transmitting a confidence value associated with each of the one or more second text elements.

9. The first computing device of claim 1, wherein the instructions, when executed by the one or more processors, cause the first computing device to process the first message by causing the first computing device to:
   determine that a first text element of the plurality of text elements belongs to a first subset of the one or more subsets based on one or more second text elements of the plurality of text elements.

10. The first computing device of claim 1, wherein the instructions, when executed by the one or more processors, cause the first computing device to transmit the one or more second text elements by causing the first computing device to:
    transmit a count of the one or more second text elements.

11. The first computing device of claim 1, wherein the message comprises one or more text elements.

12. A method comprising:
    before sending, by a first computing device, a first message to a second computing device:
       processing, by the first computing device and using a first trained machine learning model configured to determine subsets comprising at least two text elements of a plurality of text elements, the first message to determine one or more subsets comprising at least two different text elements of the plurality of text elements, wherein at least one of the one or more subsets corresponds to at least two different text element types, and wherein the first trained machine learning model was trained by modifying using first training data, one or more first weights of a first artificial neural network;
       selecting, by the first computing device, using a second trained machine learning model configured to select text elements of the plurality of text elements that correspond to one or more predicted responses to one or more messages, and based on the first message, one or more second text elements from the one or more subsets of the plurality of text elements, wherein the second trained machine learning model was trained by modifying, using second training data different from the first training data, one or more second weights of a second artificial neural network; and transmitting, by the first computing device, the one or more second text elements.

13. The method of claim 12, wherein the second computing device executes a first application, wherein the first application is a messaging application, and wherein the first message is intended to be posted in the first application.

14. The method of claim 12, wherein processing the first message comprises:
  weighting each of the plurality of text elements based on:
    a quantity of the plurality of text elements that correspond to an text element type; and
    a sentiment corresponding to the text element type.

15. The method of claim 12, wherein a first text element type of the at least two different text element types corresponds to a positive reaction, and wherein a second text element type of the at least two different text element types corresponds to a negative reaction.

16. The method of claim 12, wherein at least one of the one or more subsets further corresponds to:
  a first quantity of a first text element type of the at least two different text element types, and
  a second quantity of a second text element type of the at least two different text element types.

17. The method of claim 12, wherein transmitting the one or more second text elements comprises transmitting a confidence value associated with each of the one or more second text elements.

18. A method comprising:
  before sending, by a first computing device, textual content of a first message to a second computing device;
  processing, by the first computing device and using a first trained machine learning model configured to determine subsets comprising at least two text elements of a plurality of text elements, the textual content of the first message to determine one or more subsets comprising at least two different text elements of the plurality of text elements, and wherein the first trained machine learning model was trained by modifying, using first training data, one or more first weights of a first artificial neural network;
  determining, by the first computing device, using a second trained machine learning model configured to select text elements of the plurality of text elements that correspond to one or more predicted responses to one or more messages, and based on the textual content of the first message, one or more confidence values corresponding to one or more second text elements selected from the one or more subsets of the plurality of text elements, wherein the second trained machine learning model was trained by modifying, using second training data different from the first training data, one or more second weights of a second artificial neural network; and
  transmitting, by the first computing device, the one or more confidence values to a third computing device.

19. The method of claim 18, wherein processing the first message comprises:
  weighting each of the plurality of text elements based on:
    a quantity of the plurality of text elements that correspond to an text element type; and
    a sentiment corresponding to the text element type.

20. The method of claim 18, wherein at least one of the one or more subsets further corresponds to:
  a first quantity of a first text element type of the at least two different text element types, and
  a second quantity of a second text element type of the at least two different text element types.

* * * * *